United States Patent
Shaffer et al.

(10) Patent No.: US 7,944,830 B2
(45) Date of Patent: May 17, 2011

(54) METHODS AND APPRATUS FOR EVALUATING A UTILIZATION OF A SYSTEM THAT PROVIDES CONNECTIONS USING A NORMALIZED BANDWIDTH SCHEME

(75) Inventors: Michael S. Shaffer, Lynnfield, MA (US); Jay P. Wilshire, Pennsburg, PA (US); Harold J. Wilson, Center Valley, PA (US)

(73) Assignee: Agere Systems Inc., Allentown, PA (US)

( * ) Notice: Subject to any disclaimer, the term of this patent is extended or adjusted under 35 U.S.C. 154(b) by 162 days.

(21) Appl. No.: 12/187,692

(22) Filed: Aug. 7, 2008

(65) Prior Publication Data

US 2010/0034247 A1 Feb. 11, 2010

(51) Int. Cl.
*H04J 1/16* (2006.01)
(52) U.S. Cl. ........... 370/230.1; 370/254; 370/431; 370/465; 709/226; 709/229
(58) Field of Classification Search .......... 370/230, 370/232, 468, 431, 465
See application file for complete search history.

(56) References Cited

U.S. PATENT DOCUMENTS

| | | | |
|---|---|---|---|
| 6,973,037 B1 * | 12/2005 | Kahveci | 370/236 |
| 7,558,216 B2 * | 7/2009 | Williamson et al. | 370/254 |
| 2008/0175147 A1 * | 7/2008 | Lakkakorpi | 370/230 |
| 2009/0092048 A1 * | 4/2009 | Liang et al. | 370/235 |

* cited by examiner

*Primary Examiner* — Seema S Rao
*Assistant Examiner* — Henry Baron
(74) *Attorney, Agent, or Firm* — Ryan, Mason & Lewis, LLP (57) ABSTRACT

Methods and apparatus are provided for evaluating the throughput limit of a communication system, such as a network node or system. A throughput limit of a communication system is evaluated by receiving a request to allocate at least one connection of a given data type; obtaining an assigned weight for the at least one connection, wherein the assigned weight is based on the throughput limit and a processing limit indicating a throughput of the communication system for the given data type within a given time window; and determining whether to allocate the at least one connection of a given data type based on whether a sum of the assigned weights for each existing allocated connection for each data type exceeds the throughput limit. The assigned weight for a given data type can be subtracted from the sum upon receiving a request to de-allocate a connection.

20 Claims, 4 Drawing Sheets

| NORMALIZED UTILIZATION CALCULATION TABLE ||||
|---|---|---|---|
| NORMALIZED LIMIT (NL) | 100 | UTILIZATION | |
| NORMALIZED INTERVAL (NI) | 125 | µs | |
| PROCESSING TIMES (CELLS(PACKETS)/125µs) ||||
| SERVICE TYPE | PROCESSING LIMIT (PL) PER NI WINDOW || WEIGHT (W) |
| AAL1 | 92 || 1.087 |
| TC/IMA | 98 || 1.020 |
| PACKET-FULL | 66 || 1.515 |
| PACKET-FAST | 113 || 0.885 |

FIG. 4

ANTICIPATED CUSTOMER TRAFFIC TABLE — 400

| TYPE OF CONNECTION | USER PROVIDED DATA | | CALCULATED NORMALIZED LIMIT (CNL) PER SOURCE |
|---|---|---|---|
| | NUMBER OF CONNECTIONS (NC) | CELL/PACKET ARRIVAL RATE/125μs (AR) | |
| AAL1 | 25 | 125 | 27.175 |
| TC/IMA | 25 | 250 | 12.75 |
| PACKET-FULL | 75 | 375 | 37.875 |
| PACKET-FAST | 100 | 500 | 22.125 |
| TOTALS | 225 | - | TCNL = 99.925 |

*FIG. 5*

METHODS AND APPRATUS FOR EVALUATING A UTILIZATION OF A SYSTEM THAT PROVIDES CONNECTIONS USING A NORMALIZED BANDWIDTH SCHEME

FIELD OF THE INVENTION

The present invention relates generally to techniques for evaluating the throughput limit of a given system, and more particularly, to methods and apparatus for dynamically evaluating the throughput limit as new channels are added of different data types.

BACKGROUND OF THE INVENTION

Systems generally have a finite throughput that may cause a system failure if exceeded. For example, the throughput limit of a communication system is often expressed as a bandwidth limit or the maximum number of channels of each data type. It is important for a system operator to avoid exceeding the throughput limit to ensure reliable service for all customers. An important issue when adding additional channels to a system is determining whether the added channels will affect the reliability of a system, since working channels or paths may be affected by the additional channels. In current communication systems, the loss or corruption of data is an unacceptable situation that generally must be avoided.

A number of techniques have been proposed or suggested for determining the throughput limit of various systems. For example, the throughput limit of a communication system may be evaluated each time a new channel is added. Previous attempts to determine this throughput limit as new services are added typically require the manual checking of data path alarms, data integrity within and across systems, and some trial and error by the user. Manually checking the integrity of all channels within the system, however, is typically a time consuming and costly task.

A need therefore exists for improved methods and apparatus for evaluating the throughput limit of a given system. A further need exists for methods and apparatus for dynamically evaluating the throughput limit as new channels are added of different data types. Yet another need exists for methods and apparatus for dynamically evaluating the throughput limit based on a normalized bandwidth calculation for each data type.

SUMMARY OF THE INVENTION

Generally, methods and apparatus are provided for evaluating the throughput limit of a communication system, such as a network node or system. According to one aspect of the invention, a throughput limit of a communication system is evaluated by receiving a request to allocate at least one connection of a given data type; obtaining an assigned weight for the at least one connection, wherein the assigned weight is based on the throughput limit and a processing limit indicating a throughput of the communication system for the given data type within a given time window; and determining whether to allocate the at least one connection of a given data type based on whether a sum of the assigned weights for each existing allocated connection for each data type exceeds the throughput limit. According to a further aspect of the invention, the assigned weight for a given data type is subtracted from the sum upon receiving a request to de-allocate a connection.

The sum of the assigned weights for each existing allocated connection for each data type comprises a total calculated normalized limit. The throughput limit may be a normalized limit indicating a capacity of the system. The processing limit for each connection of a given data type can be normalized based on the throughput limit of the communication system. Once the normalized limit is reached by the existing connections, then no further connections should be added without first removing or reducing the bandwidth of existing connections.

A more complete understanding of the present invention, as well as further features and advantages of the present invention, will be obtained by reference to the following detailed description and drawings.

DETAILED DESCRIPTION

The present invention provides methods and apparatus for evaluating the throughput limit of a given node or system. As discussed more fully below, the disclosed technique determines a processing limit (PL) for each connection of a given data type. Generally, the processing limit quantifies the throughput of a network node for the associated data type within a particular time window, referred to herein as a normalized interval (NI). The processing limit is based on any resources, such as hardware and software resources, that are required by the node or system to process a connection of the associated data type. In one embodiment, the processing limit for each data type or type of service takes into account, but is not limited to, the Arrival Rate (AR) of cells and/or packets within the NI window, the partial fill of the cell and/or packet, and the processing time of the underlying hardware/software and Microcode for each protocol or data type.

In addition, a normalized limit (NL) is defined to quantify the throughput limit or total capacity of the node or system. For example, the normalized limit can be set to a value of 100 to indicate the capacity of the system. Generally, once the normalized limit is reached, then the finite throughput of the system has also been reached. Typically, once the normalized limit is reached by the existing connections, then no further connections should be added without first removing or reducing the bandwidth of existing connections.

In one exemplary embodiment, the processing limit for each connection of a given data type is normalized based on the selected normalized limit and expressed as a weight (W). Generally, the weight is calculated for each data or service type by dividing the normalized limit value by the processing limit value. Thus, the weight, W, can be expressed as follows:

$$W = NL/PL.$$

Generally, the weight assigned to each data type expresses a normalized utilization value for the associated data type.

As requests to add or delete connections are received, a total calculated normalized limit (TCNL) value is updated. Generally, the total calculated normalized limit at a given time is the sum of the weights assigned to each existing connection. Stated differently, the total calculated normalized limit indicates (typically on a percentage basis) how much of the normalized limit is currently being utilized. Thus, before new connections of any data or service type are added to a node or system, the total calculated normalized limit must be updated to ensure that the node or system has the additional throughput needed to process all existing and new traffic. Once the total calculated normalized limit is reached, then the finite throughput of the system has been reached and additional connections should generally be denied until the required capacity is available (e.g., after one or more existing connections are removed or the bandwidth of one or more existing connections is reduced).

While the exemplary embodiment described herein considers the addition or deletion of network connections by a node, the present invention can also be applied to the allocation or de-allocation of any limited resource by a system. In addition, the present invention can be applied to evaluate a finite throughput on the node level or on a network or system level, as would be apparent to a person of ordinary skill in the art. Each node, network element, or system element has a finite throughput that is reached when the total calculated normalized limit equals the normalized limit. The finite throughput of a system may be expressed, for example, as the finite throughput of the most limiting node in the system. Thus, as connections are added or deleted, the user can determine when the aggregate of the connections have reached the finite throughput limit of the system. Given the processing limit of each type of connection in a node, a network, or a system, the finite throughput of the element can be determined for a set of connections.

Figure 1:
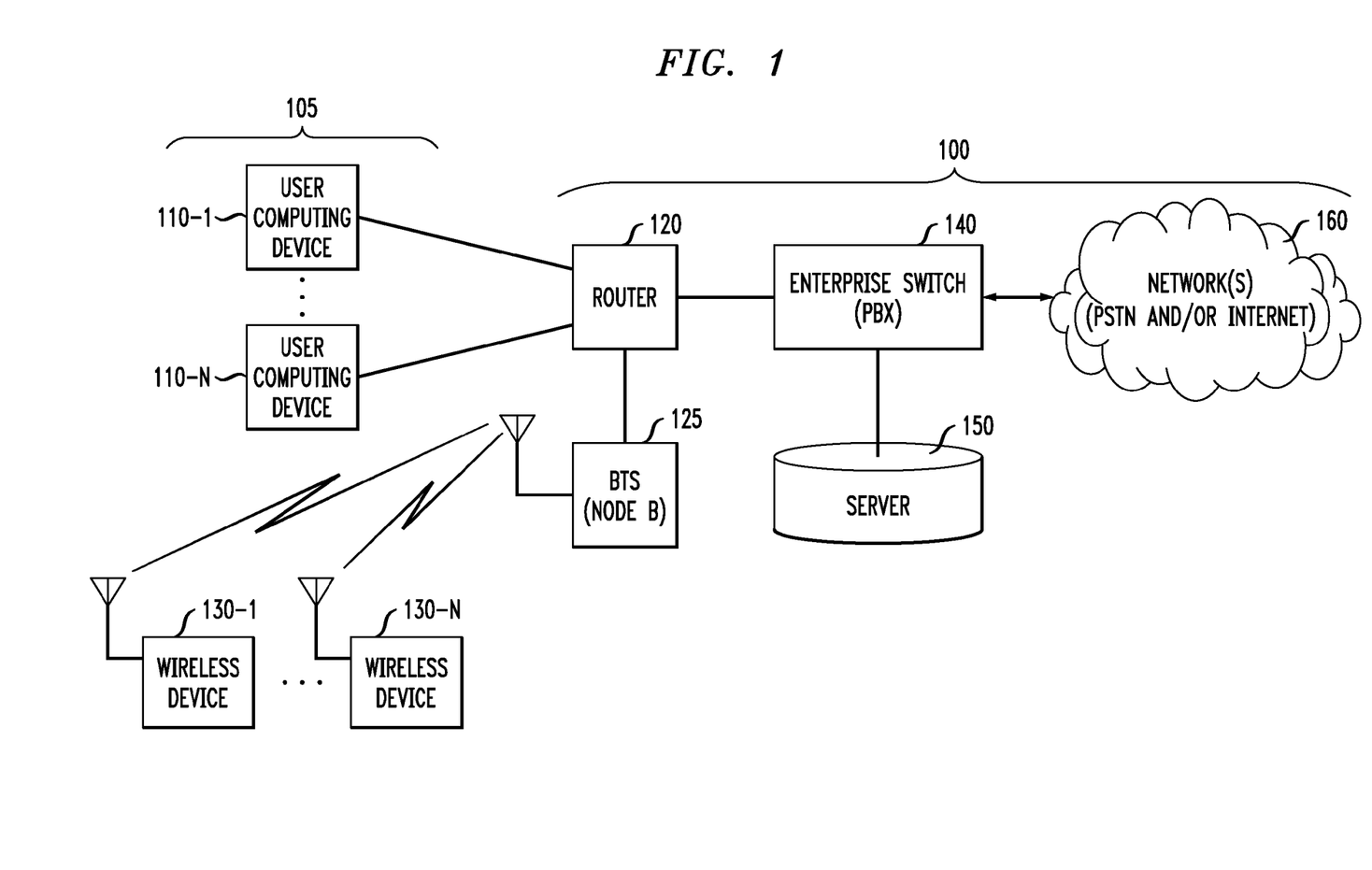
FIG. 1 illustrates an exemplary network environment in which the present invention may be implemented.

FIG. 1 illustrates an exemplary network environment 100 in which the present invention may be implemented. As shown in FIG. 1, a plurality of exemplary end-user devices 105 communicate over one or more networks in the exemplary network environment 100. For example the end-user devices 105 may comprise one or more user computing devices 110-1 through 110-N or one or more wireless devices 130-1 through 130-N (or a combination of the foregoing). The exemplary network environment 100 comprises a router 120, a base transceiver station (BTS) (node B) 125, an enterprise switch 140, such as a Private Branch Exchange (PBX) switch, a server 150 and one or more additional networks 160, such as the Public Switched Telephone Network (PSTN), the Internet, or a cellular network. Generally, the base transceiver station 125 transports wireless communications and provides a network bridge between a connection-based time division multiplexed (TDM) domain and a packet domain.

Generally, each node in the network environment 100 has a finite throughput that can be evaluated using the techniques disclosed herein. In addition, each individual network in the exemplary network environment 100, as well as the overall network environment 100 itself, has a finite throughput that can be evaluated using the techniques disclosed herein.

Figure 2:
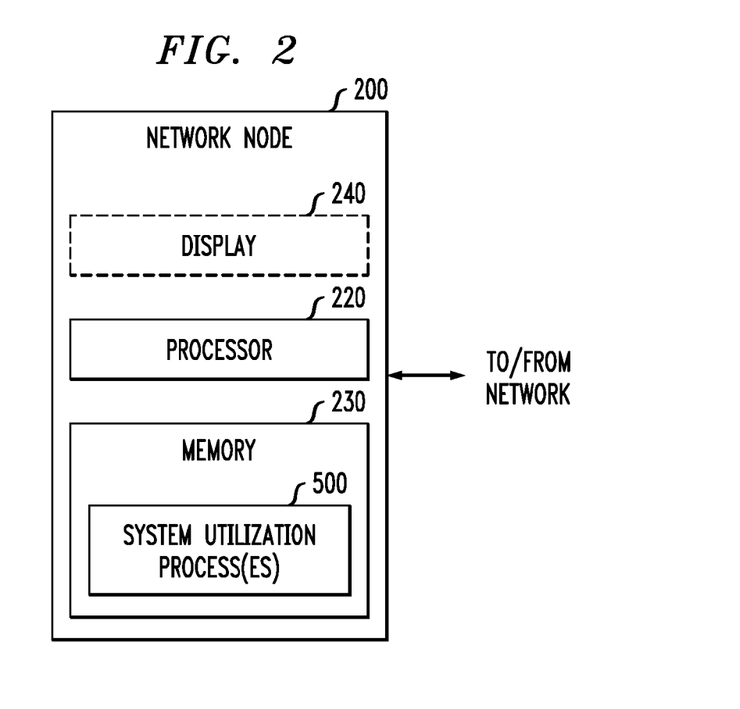
FIG. 2 is a block diagram of an exemplary network node that can implement the processes of the present invention.

FIG. 2 is a block diagram of an exemplary network node 200 that can implement the processes of the present invention. As shown in FIG. 2, memory 230 configures the processor 220 to implement the system utilization methods, steps, and functions disclosed herein (collectively, shown as 500 in FIG. 2, and discussed further below in conjunction with FIG. 5). The memory 230 could be distributed or local and the processor 220 could be distributed or singular. The memory 230 could be implemented as an electrical, magnetic or optical memory, or any combination of these or other types of storage devices. It should be noted that each distributed processor that makes up processor 220 generally contains its own addressable memory space. It should also be noted that some or all of network node 200 can be incorporated into a personal computer, laptop computer, handheld computing device, application-specific circuit or general-use integrated circuit. The network node 200 also includes the processing capability (hardware and/or software) that is monitored by the present invention, such as processing and/or forwarding of cells or packets. The network node 200 may optionally include a buffer (not shown) to buffer any bursts of cells and/or packets to ensure no data loss.

Figure 3:
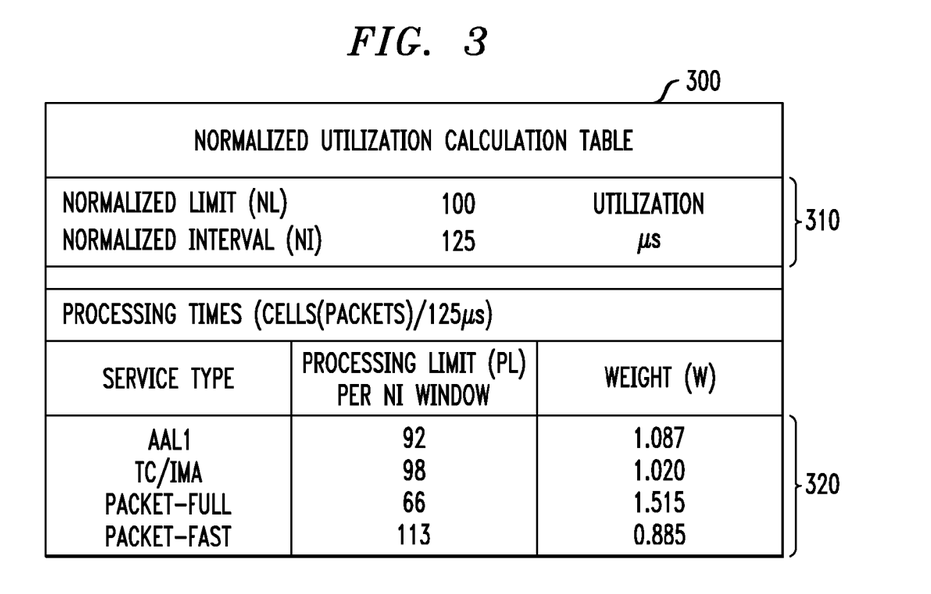
FIG. 3 is a sample table from an exemplary normalized utilization calculation database for a given node or system.

FIG. 3 is a sample table from an exemplary normalized utilization calculation database 300 for a given node or system. As shown in FIG. 3, the exemplary normalized utilization calculation database 300 contains entries 310 that record the normalized limit and normalized interval that have been established for the node or system. As previously indicated, the normalized interval is the processing window that all calculations are based upon and the normalized limit value is an arbitrary value chosen as the maximum utilization value a system can reach before the finite throughput limit is reached. In the exemplary embodiment shown in FIG. 3, the number 100 is chosen as the normalized limit to signify 100% utilization is reached.

In addition, the exemplary normalized utilization calculation database 300 contains entries 320 indicating the processing limit and weight assigned to each data or service type processed by the node or system. As previously indicated, the processing limit can be provided by a user and quantifies the throughput of a network node for the associated data type within a particular time window, referred to herein as a normalized interval (NI). In the exemplary embodiment, the data or service types processed by the node or system include ATM Adaptation Layer 1 (AAL1), Transmission Convergence/Inverse Multiplexing for ATM (TC/IMA), packet (full service type) and packet (fast service type).

In the exemplary embodiment shown in FIG. 3, the processing limit for AAL1 type traffic is 92. Generally, a processing limit of 92 indicates that the internal Microcode/Hardware/Software and physical interface System Packet Interface, Level 3 (SPI3) or Packet Over SONET (POS) Physical Layer 2 (ATM and Packet data) (PL2) working together can process 92 AAL1 cells within the normalized interval window (125 microseconds). If the associated processing limit within the normalized interval window is exceeded for any traffic type, the system will typically drop user data.

The processing limit for each connection of a given data type is normalized based on the selected normalized limit and expressed as the weight (W) shown in FIG. 3. The weight is calculated for each data or service type by dividing the normalized limit value by the processing limit value (W=NL/PL). In the exemplary embodiment shown in FIG. 3, the weight for the AAL1 type of traffic is 1.087 (100/92). The weight is interpreted as a utilization number to process one cell or packet by the system. For example, a weight of one with a normalized limit equal to 100 implies that the system can process 100 cells or packets of that particular type within the normalized interval window. Likewise, a weight of 0.5 with a normalized limit equal to 100 implies 200 cells or packets can be processed of this particular type in the selected normalized interval window.

Figure 4:
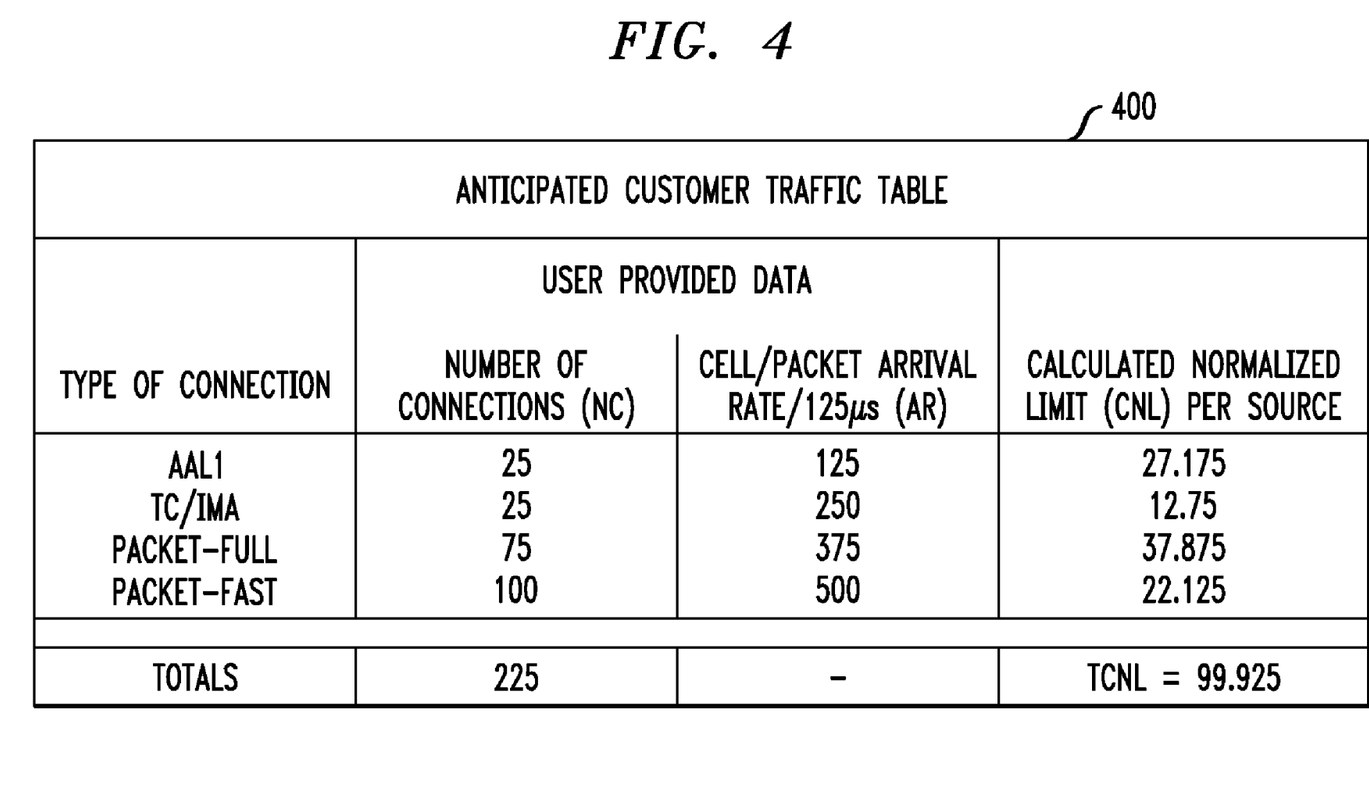
FIG. 4 is a sample table from an exemplary anticipated customer traffic table for a given node or system.

FIG. 4 is a sample table from an exemplary anticipated customer traffic table 400 for a given node or system. Generally, the exemplary anticipated customer traffic table 400 can be employed in a situation where the connections of each data type can be anticipated by a user (although the system utilization process 500 is generally still employed as each connection is requested to evaluate whether a new connection being added to a system may bring down the entire system). As shown in FIG. 4, the exemplary anticipated customer traffic table 400 corresponds to an exemplary system where there are a number of connections desired by a user. For example, the exemplary connections desired by the user may comprise:

- 25 connections (NC) of AAL1 service type with a cell generation rate of 25 cells every 125 µs (1*NI).
- 25 connections (NC) of TC/IMA service type with a cell generation rate of 25 cells every 250 µs (2*NI)
- 75 connections (NC) of Packet-full service type with a cell generation rate of 75 cells every 375 µs (3*NI)
- 100 connections (NC) of Packet-fast service type with a cell generation rate of 100 cells every 500 µs (4*NI).

As shown in FIG. 4, the calculated normalized limit (CNL) is calculated for each data type based on the number of connections (NC) anticipated for the data type. The calculated normalized limit can be expressed as follows:

$$CNL=(NI*NC*W)/AR.$$

For example, for the AAL1 service type with a cell generation rate of 25 cells for every normalized interval, the calculated normalized limit is computed as follows:

$$CNL=125*25*1.087/125$$

$$CNL=27.175.$$

Likewise, for the TC/IMA service type with a cell generation rate of 25 cells every 250 µs (two normalized intervals), the calculated normalized limit can be computed as follows:

$$CNL=125*25*1.020/250$$

$$CNL=12.75.$$

In addition, a total calculated normalized limit (TCNL) is computed to determine the throughput required for all anticipated connections of all data types. The total calculated normalized limit is the sum of the calculated normalized limits for each individual data type. The total calculated normalized limit can then be compared to the normalized limit to ensure that the finite throughput of the system is not exceeded.

The exemplary anticipated connection example shown in FIG. 4 results in a total calculated normalized limit (also referred to as a utilization factor) of 99.925. Thus, the anticipated connections have used almost the entire available throughput of the system. When the operator of the system determines that the TCNL is 99.925% of the normalized limit, the operator will know that no other connections can be added to this system without first removing others. This ensures a system failure does not occur due to over subscription by the user.

Figure 5:
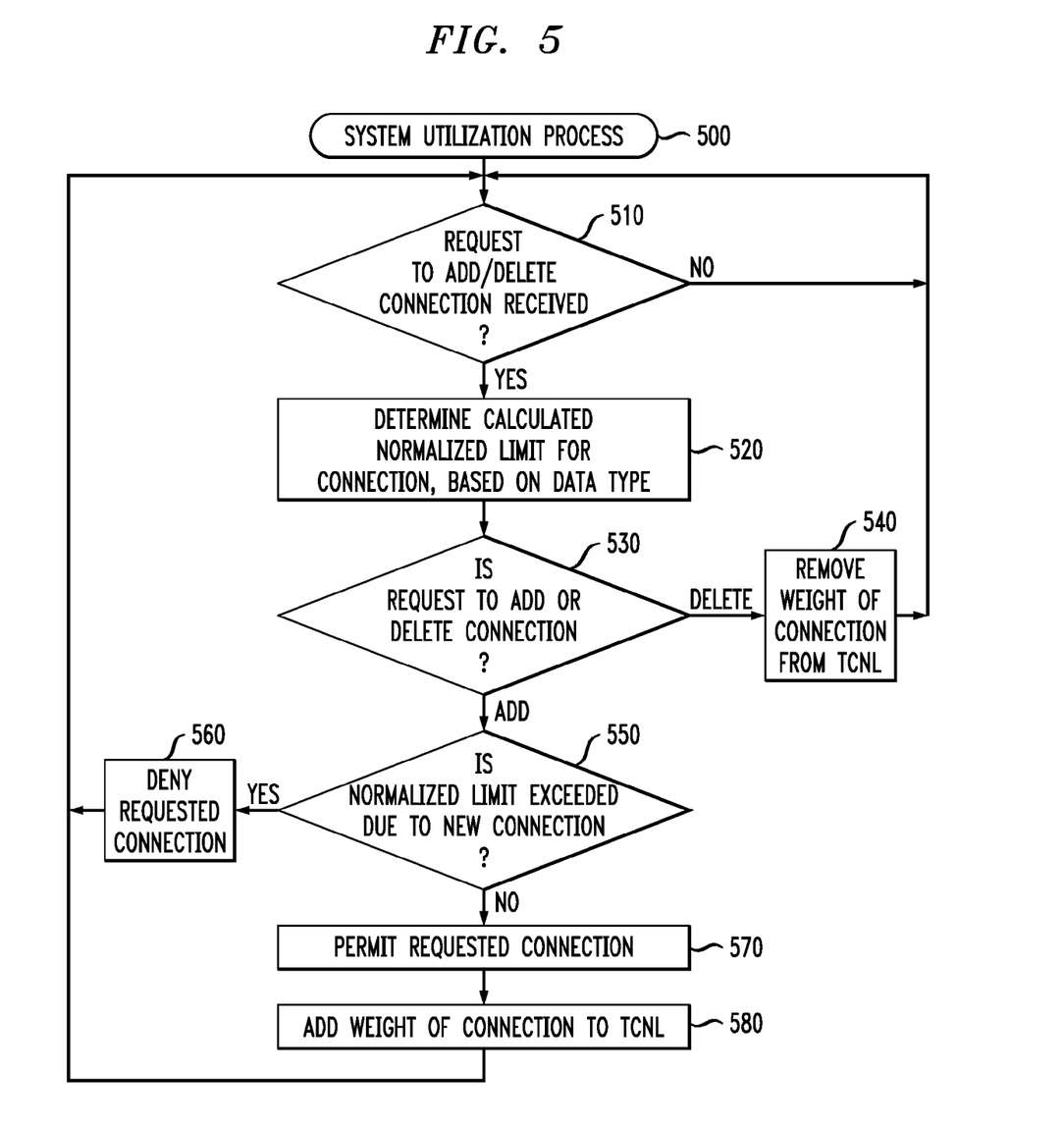
FIG. 5 is a flow chart describing an exemplary implementation of a system utilization process that incorporates features of the present invention.

FIG. 5 is a flow chart describing an exemplary implementation of a system utilization process 500 that incorporates features of the present invention. As shown in FIG. 5, the exemplary system utilization process 500 is initiated during step 510 upon receipt of a new request to add or delete a connection. Once a request is received to add or delete a connection, the calculated normalized limit is determined for the connection during step 520, based on the data type.

A test is performed during step 530 to determine if the request is to add or delete a connection. If it is determined during step 530 that the request is to delete a connection, then the weight of deleted connection is removed from the total calculated normalized limit during step 540. As previously indicated, updating of the total calculated normalized limit as connections are added or removed allows the present invention to ensure that the system has the additional throughput needed to process all existing and new traffic. The calculation of the total calculated normalized limit during step 540 (and step 580) can occur manually or can be embedded in the user interface software of a system.

If, however, it is determined during step 530 that the request is to add a connection, then a further test is performed during step 550 to determine if the normalized limit of the node or system is exceeded due to the new connection. If it is determined during step 550 that the normalized limit of the node or system is exceeded, then the requested connection is denied during step 560 (unless a mechanism is in place to remove one or more connections or to reduce the bandwidth of existing connections). It is noted that a user may place a guard band on the TCNL so that the 100% mark is never reached. For example, a user may only allow 90% utilization of the system.

If, however, it is determined during step 550 that the normalized limit of the node or system is not exceeded, then the requested connection is allowed during step 570 and the weight associated with the new connection is added to the total calculated normalized limit during step 580. Thereafter, program returns to step 510 until a new request to add or delete a connection is received.

The exemplary system utilization process 500 can be extended to take into account any interactions that may affect the processing limit time when multiple channels of different types are running in a system simultaneously. For example, the Processing Limit (PL) values may change depending on the mix of data types being processed by the node or network. Assume that the designers of a given node have determined that the PL decreases for AAL1 type traffic if packet data is also being transported over the network simultaneously. The Processing Limit for ALL1 PL connections without packet processing may equal 92 but in the presence of packet processing, the Processing Limit may change to 75. When the first packet connection is added to the system, the system utilization process 500 may indicate to the operator that the number of AAL1 connections needs to be reduced before the packet connection is added. This is only possible because the new PL for ALL1 type traffic would now be used in the TCNL calculation resulting in exceeding the NL. Other changes to the data may reduce the PL of certain data types. For example, the partial fill of an ATM cell or a packet payload size may affect the PL value. A large payload size (for example, greater than 1000 bytes) may reduce the throughput if packets with 64 bytes are also being transported. In general, the PL values can take into account anything the designers of the system or node have determined will reduce the finite processing limit of that node.

Conclusion

While FIG. 5 shows an exemplary sequence of steps, it is also an embodiment of the present invention that the sequence may be varied. Various permutations of the algorithm are contemplated as alternate embodiments of the invention.

In addition, while exemplary embodiments of the present invention have been described with respect to processing steps in a software program, as would be apparent to one skilled in the art, various functions may be implemented in the digital domain as processing steps in a software program, in hardware by circuit elements or state machines or in combination of both software and hardware. Such software may be employed in, for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium wherein, when the program code is loaded into and executed by a machine, such as a computer the machine becomes an apparatus for practicing the invention. When implemented on a general-purpose processor, the program code segments combine with the processor to provide a device that operates analogously to specific logic circuits. The invention can also be implemented in one or more of an integrated circuit, a digital signal processor, a microprocessor, and a micro-controller.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium is a tangible recordable medium (e.g., floppy disks, hard drives, compact disks, memory cards, semiconductor devices, chips, application specific integrated circuits (ASICs)). The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

We claim:

1. A method for evaluating a throughput limit of a communication system, comprising:
    receiving a request to allocate at least one connection of a given data type, wherein said given data type is one of a plurality of data types, wherein each data type has an assigned weight, and wherein each assigned weight is based on said communication system throughput limit and a processing limit, wherein said processing limit indicates a relative processing throughput rate for said corresponding data type within a given time window;
    obtaining an assigned weight for said at least one connection; and
    determining whether to allocate said at least one connection of a given data type based on whether a sum of resource requirements for any existing allocated connection for each data type and said requested allocation exceeds said throughput limit, wherein said resource requirements are normalized based on an associated assigned weight.

2. The method of claim 1, wherein said sum of said resource requirements for each existing allocated connection for each data type comprises a total calculated normalized limit.

3. The method of claim 1, wherein said throughput limit is a normalized limit indicating a capacity of said system.

4. The method of claim 1, wherein said communication system comprises one or more of a node and a network.

5. The method of claim 1, further comprising the steps of receiving a request to de-allocate at least one connection of a given data type and subtracting said resource requirement for said given data type from said sum.

6. The method of claim 1, wherein said determining step further comprises the step of removing one or more existing connections if said sum exceeds said throughput limit.

7. The method of claim 1, wherein said determining step further comprises the step of reducing a bandwidth of one or more existing connections if said sum exceeds said throughput limit.

8. The method of claim 1, wherein said processing limit for each connection of a given data type is normalized based on said throughput limit of said communication system.

9. The method of claim 1, further comprising the step of buffering a burst of data.

10. An apparatus for evaluating a throughput limit of a communication system, the apparatus comprising:
    a memory; and
    at least one processor, coupled to the memory, operative to:
        receive a request to allocate at least one connection of a given data type, wherein said given data type is one of a plurality of data types, wherein each data type has an assigned weight, and wherein each assigned weight is based on said communication system throughput limit and a processing limit, wherein said processing limit indicates a relative processing throughput rate for said corresponding data type within a given time window;
        obtain an assigned weight for said at least one connection; and
        determine whether to allocate said at least one connection of a given data type based on whether a sum of resource requirements for any existing allocated connection for each data type and said requested allocation exceeds said throughput limit, wherein said resource requirements are normalized based on an associated assigned weight.

11. The apparatus of claim 10, wherein said sum of said resource requirements for each existing allocated connection for each data type comprises a total calculated normalized limit.

12. The apparatus of claim 10, wherein said throughput limit is a normalized limit indicating a capacity of said system.

13. The apparatus of claim 10, wherein said communication system comprises one or more of a node and a network.

14. The apparatus of claim 10, wherein said processor is further configured to receive a request to de-allocate at least one connection of a given data type and subtracting said resource requirement for said given data type from said sum.

15. The apparatus of claim 10, wherein said processor is further configured to remove one or more existing connections if said sum exceeds said throughput limit.

16. The apparatus of claim 10, wherein said processor is further configured to reduce a bandwidth of one or more existing connections if said sum exceeds said throughput limit.

17. The apparatus of claim 10, wherein said processing limit for each connection of a given data type is normalized based on said throughput limit of said communication system.

18. The apparatus of claim 10, wherein said processor is further configured to initiate a buffering of a burst of data.

19. The apparatus of claim 10, wherein the apparatus is embodied on an integrated circuit.

20. An article of manufacture for evaluating a throughput limit of a communication system, comprising a tangible machine readable storage medium containing one or more programs which when executed by a processor implement the steps of:

receiving a request to allocate at least one connection of a given data type, wherein said given data type is one of a plurality of data types, wherein each data type has an assigned weight, and wherein each assigned weight is based on said communication system throughput limit and a processing limit, wherein said processing limit indicates a relative processing throughput rate for said corresponding data type within a given time window;

obtaining an assigned weight for said at least one connection; and determining whether to allocate said at least one connection of a given data type based on whether a sum of resource requirements for any existing allocated connection for each data type and said requested allocation exceeds said throughput limit, wherein said resource requirements are normalized based on an associated assigned weight.

* * * * *

UNITED STATES PATENT AND TRADEMARK OFFICE
CERTIFICATE OF CORRECTION

| | | |
|---|---|---|
| PATENT NO. | : 7,944,830 B2 | Page 1 of 1 |
| APPLICATION NO. | : 12/187692 | |
| DATED | : May 17, 2011 | |
| INVENTOR(S) | : Michael S. Shaffer et al. | |

It is certified that error appears in the above-identified patent and that said Letters Patent is hereby corrected as shown below:

In column 5, line 55, "FIG. S" should be replaced by -- FIG. 5 --

Signed and Sealed this
Eighteenth Day of December, 2012

David J. Kappos
*Director of the United States Patent and Trademark Office*